United States Patent [19]

Wootton, III

[11] 3,913,094

[45] Oct. 14, 1975

[54] COUNT SEQUENCE TEST SET FOR A DISC TYPE DIGITAL ENCODER

[75] Inventor: William F. Wootton, III, Bloomington, Ind.

[73] Assignee: The United States of America as represented by the Secretary of the Navy, Washington, D.C.

[22] Filed: Mar. 20, 1974

[21] Appl. No.: 452,909

[52] U.S. Cl. .............................. 340/347 DD; 324/74
[51] Int. Cl.² ........................................ H03K 13/32
[58] Field of Search.................... 235/177, 175, 155; 340/347 DD, 347 P; 324/74; 250/231 SE

[56] References Cited
UNITED STATES PATENTS

| | | | |
|---|---|---|---|
| 2,986,726 | 5/1961 | Jones .......................... | 340/347 DD |
| 3,032,268 | 5/1962 | Lucas et al. ......................... | 235/177 |
| 3,680,046 | 7/1972 | Bergey et al. ........................ | 235/177 |

Primary Examiner—Thomas J. Sloyan
Attorney, Agent, or Firm—R. S. Sciascia; Paul S. Collignon

[57] ABSTRACT

A dynamic test set for encoders whose output code is two distinctly different gray codes. The two gray codes are converted to binary, then added together and fed to a storage register. The readout from the storage register is fed to an error detection circuit which approves an allowable difference in count of ±1, ±9, ±11 and ± full count. Any other difference in count will cause an alarm to be energized thereby indicating an output error from the encoder.

4 Claims, 8 Drawing Figures

COUNT SEQUENCE TEST SET FOR A DISC TYPE DIGITAL ENCODER

BACKGROUND OF THE INVENTION

The present invention relates to a test set for checking an output count sequence, and more particularly for checking the output of an encoder which reports altitude of an aircraft.

In many aircraft, both military and commercial, an altitude computer is provided which senses barometric pressure, angle of attack and pilot static pressure and mechanically computes the aircraft's altitude. A transponder is provided for transmitting, when desired, an aircraft's altitude to a ground air traffic controller. An encoder is used as an interface between the altitude computer and the transponder. The encoder is driven by means of a servo loop to the desired position to represent an aircraft's altitude when interrogated from the ground air traffic controller.

Digital encoders, of the type to be tested by the present invention, are electromechanical devices which translate input shaft angle information into digital electrical signals. These encoders are basically of two types, that is, contact or noncontact encoders.

Contact encoders utilize direct physical contact of electrically conductive pickoffs to sense the coded information on a disc by completing the circuit with conductive area on the disc. Contact encoder reliability is characterized by an increasing time dependent failure rate due to physical wear on the disc and sliding contacts which have led to many studies regarding predictability of contact closures. The sliding action, inherent in all contact encoders, also causes particles to be dislodged from the conductive surfaces and deposited on nonconducting surfaces and impair the conductivity of the junction of the generally dissimilar metals and the capability of distinguishing the coded information.

Noncontact encoders are similar to the contact type except that direct physical contact with the coded disc is not utilized. Sensing of the disc information is generally accomplished by optical or magnetic means. Optical encoders use a light sensing device which detects a light source transmitted through a mask and clear segments of a disc coded with clear and opaque segments. A logical "one" is detected by this sensor when light passes through and a "zero" is indicated by the absence of light. Magnetic encoders utilize a magnetically coded ferrite disc in which the sensor detects a logical "one" in the absence of discrete saturating magnetic fields and a logical "zero" when the sensor is in the immediate vicinity of a magnetic area on the disc. Optical encoders are also characterized by an increasing time dependent failure rate, due primarily to the decaying characteristics of the light source. These devices require efficient production and transfer of light for reliable operation, which can be interrupted by failure of the light source, or degradation light transmissibility through the optical surfaces by deposition of dust, condensates and chemical films. Light sources commonly used in optical encoders exhibit an increasing, time dependent failure rate and a maximum useful life of approximately 10,000 hours. The characteristics of both the sensors and the light source are subject to drifting at temperature extremes and require considerable electronics in various temperature compensating schemes.

SUMMARY OF THE INVENTION

The present invention relates to a test set for encoders whose outputs are an eight bit gray code plus a three bit cyclic gray code. The outputs from the encoder is interfaced with a storage register having a plurality of D-type flip-flops which act as sample and hold devices. The outputs of the flip-flops are updated by a clock. The outputs from the storage register are fed to a gray code to binary converter and to a cyclic gray code to binary converter. The two binary codes are then combined and passed to a detector for determining negative altitude, that is, an altitude below sea level. The code is then passed to an error detection circuit which approves an allowable difference in count of $\pm 1$, $\pm 9$, $\pm 11$ and $\pm$ full count. Any other difference in count will cause an alarm to be energized thereby indicating an output error from the encoder.

It is therefore a general object of the present invention to provide a dynamic test set for encoders whose output code is two different gray codes.

Other objects, advantages, and novel features of the present invention will become apparent from the following detailed description of the invention when considered in conjunction with the accompanying drawings.

DESCRIPTION OF THE PREFERRED EMBODIMENT

Figure 1:
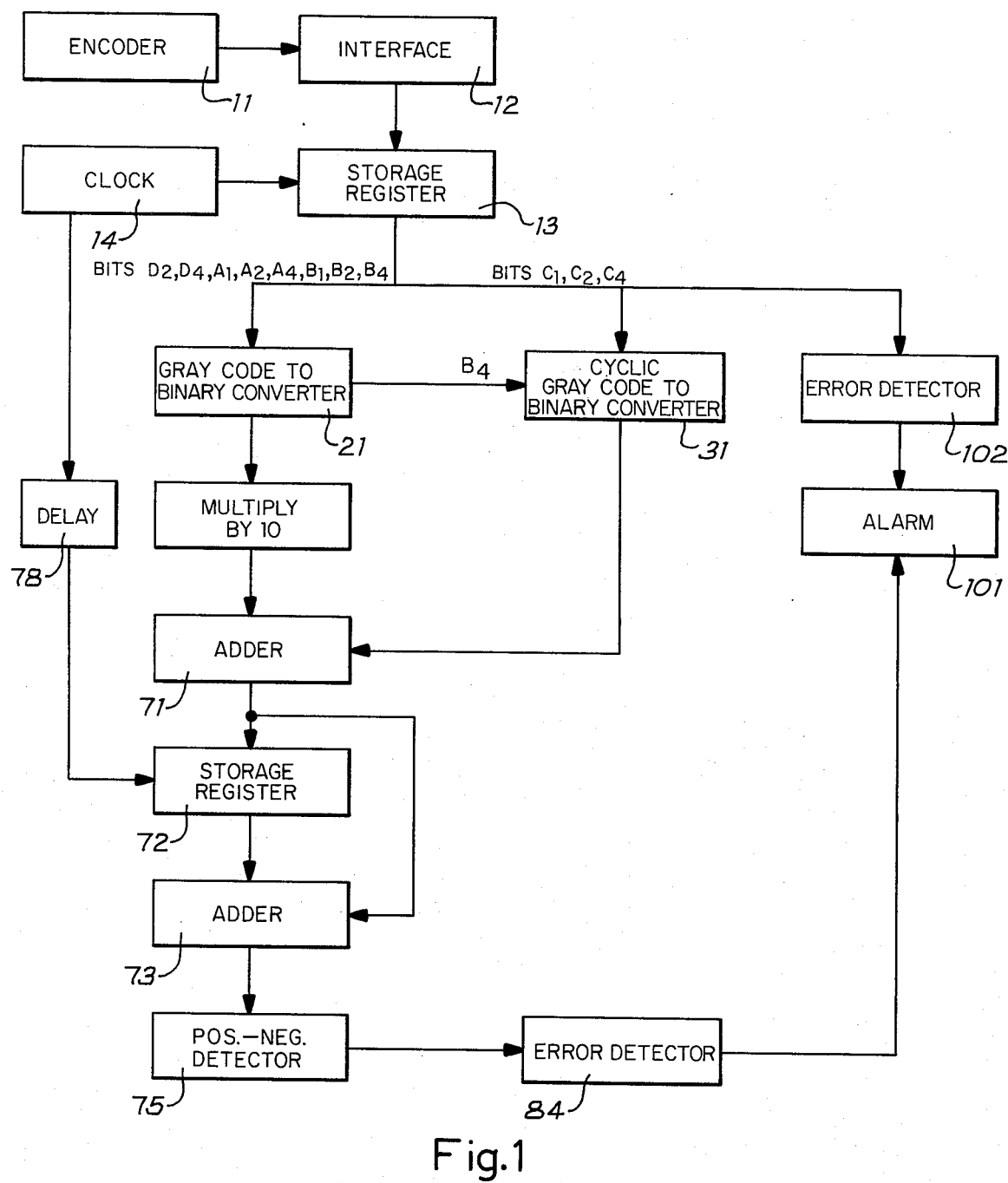
FIG. 1 is a block diagram of a preferred embodiment of the present invention.

Referring first to FIG. 1 of the drawing, an encoder 11 to be tested is of the type having 11 data line outputs. The code used is an eight bit gray code having bits designated $D_2$, $D_4$, $D_1$, $A_2$, $A_4$, $B_1$, $B_2$, and $B_4$, and a three bit cyclic gray code having bits designated $C_1$, $C_2$, and $C_4$. The least three significant bits $C_1$, $C_2$, and $C_4$ in conjunction with the fourth least significant bit $B_4$ encode hundred foot increments and $B_4$, taken by itself, encodes 500 foot increments. The remaining seven bits encode 1000 foot increments. The overall encoder altitude ranges from $-1200$ feet to $+126,800$ feet and since a binary numbering system does not recognize negative numbers, a correction factor must be added to the binary word. This correction factor is accomplished by exchanging the $C_1$ and $C_4$ tracks when the code passes through the zero foot altitude point.

The test set of the present invention allows for changes of $\pm 1$ and $\pm$ full count. The swapping of positions of $C_1$ and $C_4$ causes two additional changes, that is $\pm 9$ and $\pm 11$, which must be allowed for in the error detecting circuit. If a change other than these should occur, an error warning device is activated.

There are two types of encoders which can be tested by the present invention, i.e., contacting and noncontacting. The contacting type of encoders have brushes or pins which act as switches and make or break the continuity with the common lead for each bit. Since the brushes or pins are moving from conducting to nonconducting areas on the code disc, brush noise (or contact bounce) becomes an important consideration in designing the interface 12. The test set must be fast enough to see the brush bounce. The contact resistance for the contacting type encoders is specified at 2500 ohms nominal.

The noncontacting encoders use optical or magnetic sensing techniques to detect the shaft position. The output is normally an open collector transistor which is switched from saturation to cutoff by the internal selection circuitry. The noncontacting encoders are less susceptible to noise, consequently the contacting encoder will pose the worst case condition for the interface circuits.

Figure 2:
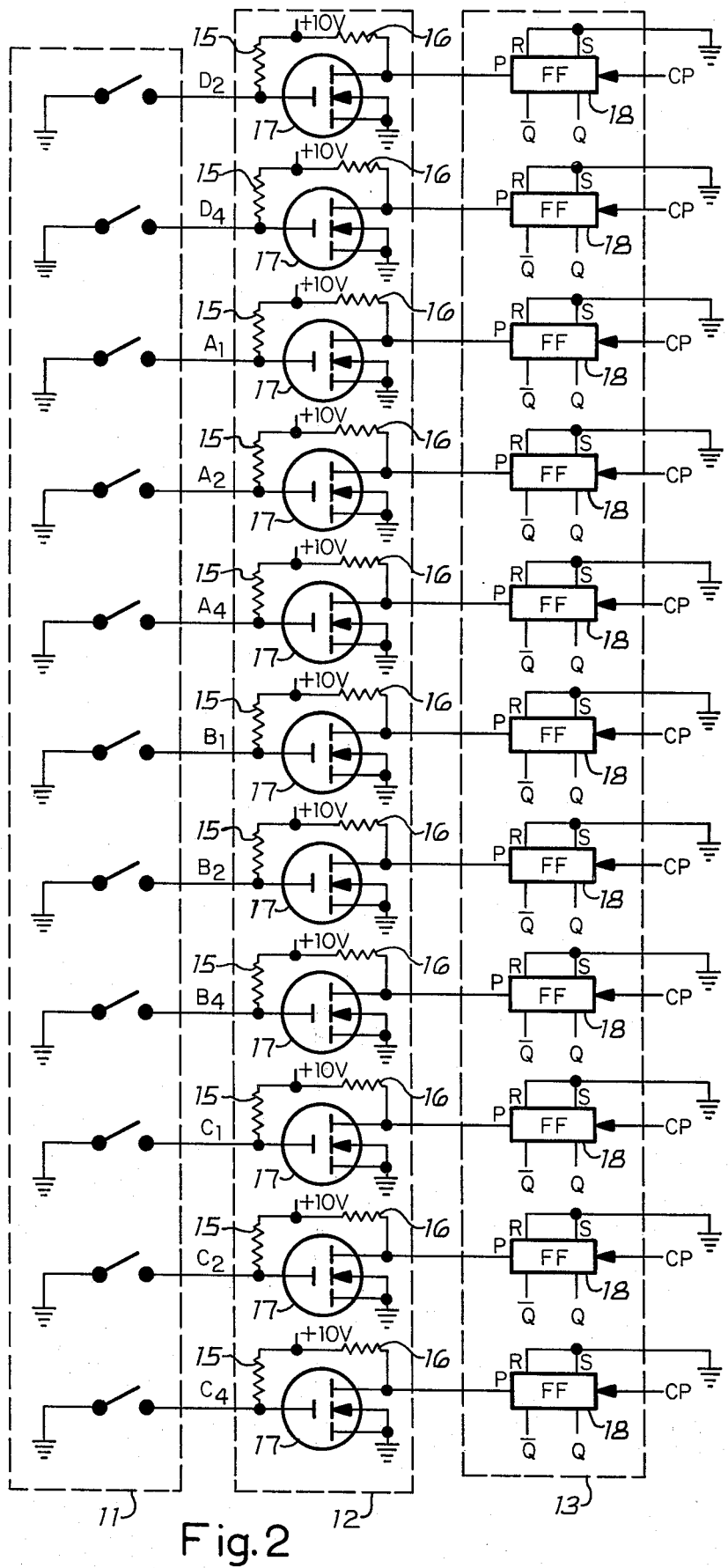
FIG. 2 is a block diagram showing interface connections between an encoder and the test set of the present invention.

The interface circuit 12 should not load the output of the encoder so that the noise on the data line will be transmitted to the test set. A 'P' or 'N' channel MOS FET would be acceptable because of its very high input impedance. Since the encoders are used in a positive voltage positive logic condition, the N channel device was chosen. FIG. 2 of the drawings shows a schematic diagram of the interface circuit 12. A 6.8K ohms resistor 15 from the +10 volts to the gate of transistor 17 supplies 1.0 ma to the contacts of encoder 11 when the contacts are "closed" to the conducting portion of the code disc. As can be seen in FIG. 2 of the drawing, eleven interface MOS FET devices 17 and associated circuitry are provided, there being one for each of the eleven bits. The outputs from these eleven MOS FET devices 17 are fed to the data inputs of D-type flip-flops 18, which act as sample and hold devices. The outputs of the D-type flip-flops are updated by clock 14 every 300 μs. The transfer of data occurs only on the positive going edge of the clock pulse.

The conversion of the eight bit gray code to binary is accomplished in converter 21 by starting with the MSB (Most Significant Bit, $D_2$) and working toward the least significant bit (LSB, $B_4$). The MSB is carried through and stored along with adding it to the MSB-1 or the adjacent bit to the right. The sum of this addition is stored and simultaneously added to the MSB-2 and so on down to the LSB.

The following example shows a conversion being accomplished for an altitude of 87,400 feet. The eight bit gray code provided by encoder 11 for 87,400 feet is 1 1 1 0 1 0 1 1 and conversion to a binary code is accomplished by starting with the MSB (Most Significant Bit, $D_2$) and working toward the LSB (Least Significant Bit, $B_4$). The MSB is stored along with adding it to MSB-1 ($D_4$).

EXAMPLE

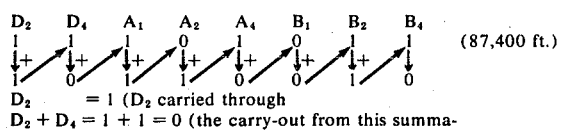 (87,400 ft.)

$D_2$ = 1 ($D_2$ carried through
$D_2 + D_4 = 1 + 1 = 0$ (the carry-out from this summa-

EXAMPLE—Continued tion is disregarded)

$0 + A_1 = 0 + 1 = 1$
$1 + A_2 = 1 + 0 = 1$
$1 + A_4 = 1 + 1 = 0$
$0 + B_1 = 0 + 0 = 0$
$0 + B_2 = 0 + 1 = 1$
$1 + B_4 = 1 + 1 = 0$

The conversion of the eight bit gray code to binary can be made by using various logic components, however, in a preferred embodiment, "exclusive-or" components 22 through 28 are used for performing the conversion.

The conversion of cyclic gray code to natural binary in converter 31 requires the use of a four-bit truth table or standard basis. The standard basis contains all possible combination of the four bits $C_4$, $C_2$, $C_1$ and the output of the conversion of $B_4$, as follows:

TABLE I

| | |
|---|---|
| $C_4 =$ | 0 1 0 1 0 1 0 1 0 1 0 1 0 1 0 1 |
| $C_2 =$ | 0 0 1 1 0 0 1 1 0 0 1 1 0 0 1 1 |
| $C_1 =$ | 0 0 0 0 1 1 1 1 0 0 0 0 1 1 1 1 |
| $B_4 =$ | 0 0 0 0 0 0 0 0 1 1 1 1 1 1 1 1 |

The decimal number equivalent of the last four bits of the altitude reporting code are as follows:

TABLE II

| 100 - FOOT PULSES | | | SUM OF DIGITS OF GRAY CODE | |
|---|---|---|---|---|
| $C_1$ | $C_2$ | $C_4$ | (1) | (0) |
| 0 | 0 | 1 | 7 | 8 |
| 0 | 1 | 1 | 6 | 9 |
| 0 | 1 | 0 | 5 | 0 |
| 1 | 1 | 0 | 4 | 1 |
| 1 | 0 | 0 | 3 | 2 |

Tables I and II are combined and a natural binary equivalent of each decimal number is written and placed under the corresponding column of that decimal number thereby forming a new basis.

TABLE III

| | |
|---|---|
| X = | don't care term |
| | X 8 0 9 2 X 1 X X 7 5 6 3 X 4 X |
| $C_4 =$ | 0 1 0 1 0 1 0 1 0 1 0 1 0 1 0 1 |
| $C_2 =$ | 0 0 1 1 0 0 1 1 0 0 1 1 0 0 1 1 |
| $C_1 =$ | 0 0 0 0 1 1 1 1 0 0 0 0 1 1 1 1 |
| $B_4 =$ | 0 0 0 0 0 0 0 0 1 1 1 1 1 1 1 1 |
| $2^0 =$ | X 0 0 1 0 X 1 X X 1 1 0 1 X 0 X |
| $2^1 =$ | X 0 0 0 1 X 0 X X 1 0 1 1 X 0 X |
| $2^2 =$ | X 0 0 0 0 X 0 X X 1 1 1 0 X 1 X |
| $2^3 =$ | X 1 0 1 0 X 0 X X 0 0 0 0 X 0 X |

Figure 3:
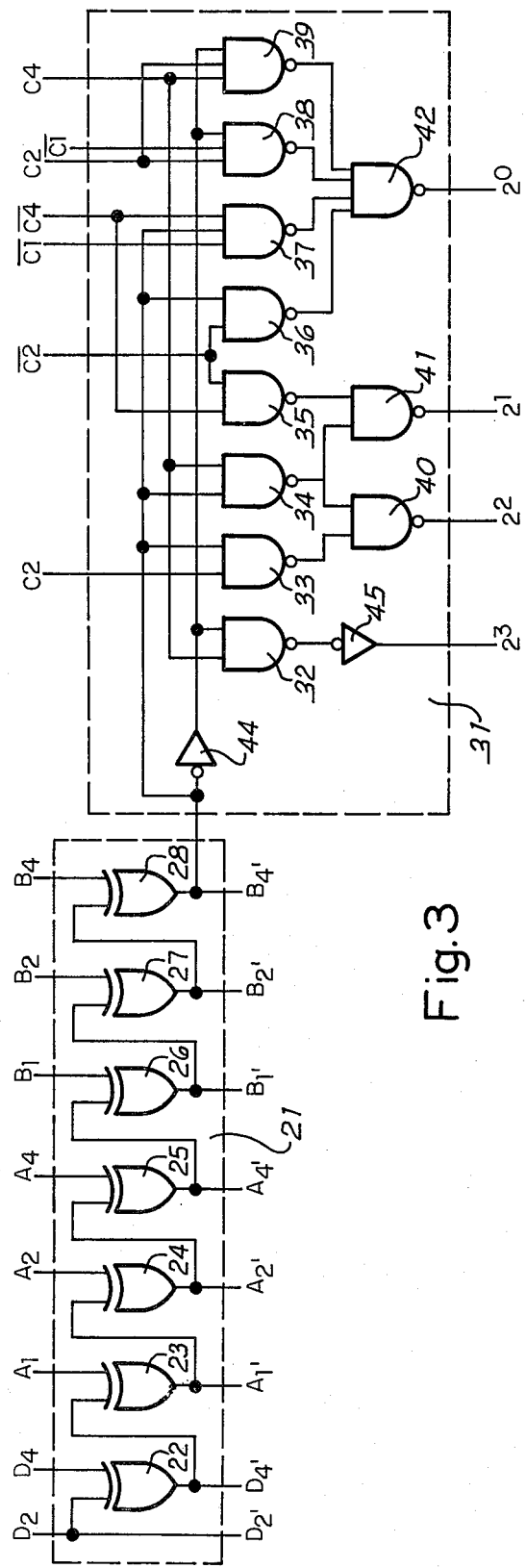
FIG. 3 is a logic diagram for gray code and cyclic gray code converters.

The new basis can be mapped row by row to obtain the corresponding Boolean combination of the input variables and, in FIG. 3 of the drawings, there are shown "and" gate components 32 through 42 for performing the conversion.

An example using +800 feet and −800 feet will show that bits $C_1$ and $C_4$ change places when the code goes from positive to negative numbers. The encoder 11 readout for +800 feet is 0 0 0 0 0 1 1 0/0 0 1. The sum of the digits of the gray code is 0, that is 0 + 0 + 0 + 0 + 0 + 1 + 1 + 0, and the 100 feet pulse code is 001. Referring to TABLE II, moving across the row labeled 001 to the column for the sum of the digits of gray code labeled (0), the associated decimal digit is 8 or 800 feet.

The encoder 11 readout for −800 feet is 0 0 0 0 0 0 0 0/1 0 0 and the sum of the gray code digits is 0. Referring again to TABLE II, moving across the row labeled 100 to the column for the sum of the digits of gray code labeled (0), the associated decimal digit is 2 and not 8. However, if the $C_1$ and $C_4$ bits are interchanged, bit $C_1$ changes from a 1 to a 0 and bit $C_4$ changes from a 0 to 1, and the resulting number for the 100 feet pulses becomes 001. Again using TABLE II and moving across the row 001 to the column for the sum of the digits of gray code labeled (0), the associated decimal digit is 8. Since bits $C_1$ and $C_4$ were interchanged, and the originally coded word represented −800 feet, it can be seen that for negative numbers, bits $C_1$ and $C_4$ must be interchanged to obtain the equivalent negative decimal digit.

Figure 4:
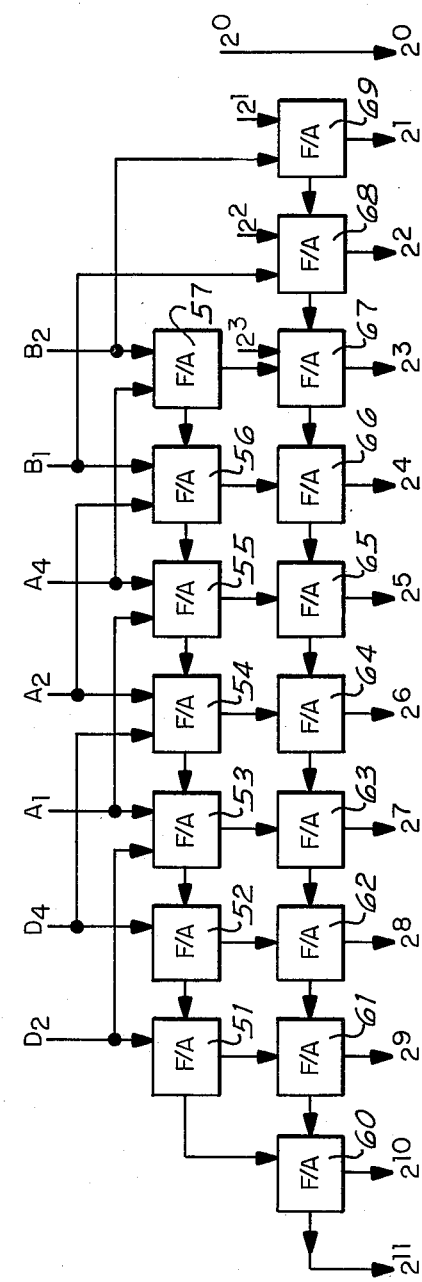
FIG. 4 is a logic diagram of a multiplication and addition circuit.

The two natural binary codes which are provided as outputs from converters 21 and 31 represent 1000-foot increments and 100 foot increments of altitude. Direct addition of the two codes is inappropriate as the first represents a number which is 10 times the second. Addition of the two codes can be accomplished if the first code is multiplied by 10 or the second code is divided by 10. In the preferred embodiment, multiplication is used, as the implementation of divide by 10 is extremely cumbersome in the number of circuits required and also is complex in synchronizing the timing with the other circuitry. Multiplication by 10 can be accomplished as shown in FIG. 4 of the drawings, by using one row of full adders 51 through 57 and the addition of the 100 foot increments to the resultant number with a second row of full adders 60 through 69.

Figure 5:
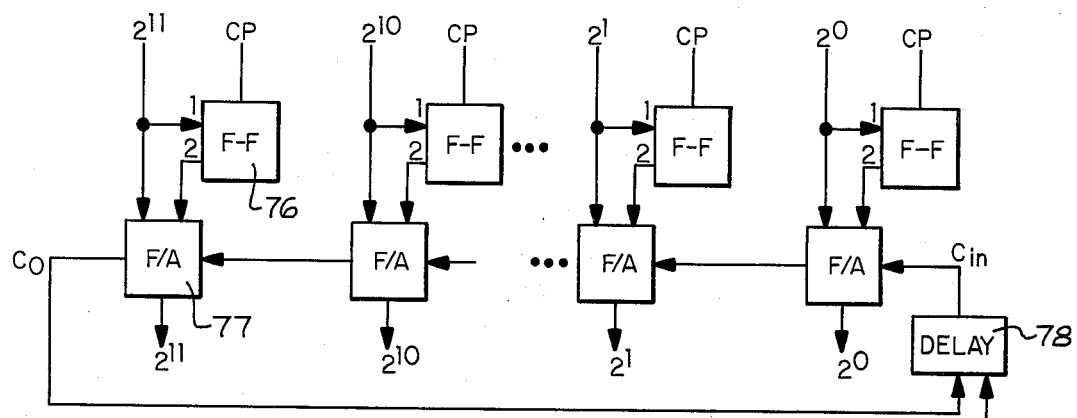
FIG. 5 is a logic diagram for a subtraction circuit.

The outputs from adder 71, which performs the addition of the thousand foot code (multiplied by 10) and the hundred foot code are fed simultaneously to a storage register 72 and to a full-adder 73. As shown in FIG. 5, storage register 72 acts as a sample-and-hold circuit similar to the first sample-and-hold circuit used in storage register 13 except that the clock input pulse's leading edge is delayed by 35 $\mu$sec from the leading edge of the master clock pulses. The "not Q" terminal from storage register 72 is fed to the second input of the full-adder 73. If a change in the code appears after the clock to this storage register goes "high" a change (or binary number) will occur at the output of full-adder 73 which will represent the difference between the two numbers if the carry-out of full-adder 73 is fed back to the carry-in.

The following two examples, using the numbers 3 and 5 will help explain the operation of adder 73.

EXAMPLE I

In an ascending count, the number 3 (011) is inverted and stored, and then the number 5 (101) is added to get a change of 2 (010) as follows:

| | | |
|---|---|---|
| N(NEW) | 5 | 101 |
| N(OLD) | 3 | +100 (INVERTED) |
| DIFFERENCE | 2 | 1/001 |
| ADD CARRY-OUT | | 1 |
| | | 010 = 2 |

EXAMPLE II

In a descending count,

| | | |
|---|---|---|
| N(NEW) | 3 | 011 |
| N(OLD) | 5 | +010 (INVERTED) |
| DIFFERENCE | 2 | 0/101 |
| ADD CARRY-OUT | | 0 |
| | | 101 = 5 |

Figure 6:
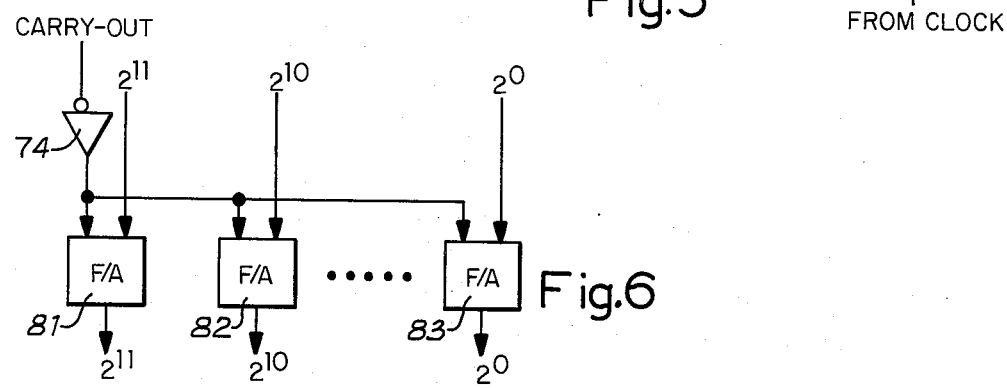
FIG. 6 is a logic diagram for an inversion circuitry for negative numbers.

In order to obtain the binary equivalent of 2, the binary number 101 must be inverted, that is 101 becomes 010 = 2. It should be noted that in the first example of an ascending count the carry-out was in a logic 1 state and in the second example of a descending count, the carry-out was in a logic 0 state. As shown in FIG. 6 of the drawings, the carry-out is fed to an inverter 74 and simultaneously to the carry-in of adder 73, and the output of inverter 74 connected to the input of full-adder 75, which serve as a positive-negative detector, whereby the change in magnitude of the difference of two numbers is inverted during descending count.

Table IV shows the output codes for the allowable differences in count:

TABLE IV

| | DIFFERENCE CODES | | | | | | | | | | | | |
|---|---|---|---|---|---|---|---|---|---|---|---|---|---|
| | Sign 0(+) 1(−) | $2^{11}$ | $2^{10}$ | $2^9$ | $2^8$ | $2^7$ | $2^6$ | $2^5$ | $2^4$ | $2^3$ | $2^2$ | $2^1$ | $2^0$ |
| +1 | 0 | 0 | 0 | 0 | 0 | 0 | 0 | 0 | 0 | 0 | 0 | 0 | 1 |
| −1 | 1 | 0 | 0 | 0 | 0 | 0 | 0 | 0 | 0 | 0 | 0 | 0 | 1 |
| +9 | 0 | 0 | 0 | 0 | 0 | 0 | 0 | 0 | 0 | 1 | 0 | 0 | 1 |
| −9 | 1 | 0 | 0 | 0 | 0 | 0 | 0 | 0 | 0 | 1 | 0 | 0 | 1 |
| +11 | 0 | 0 | 0 | 0 | 0 | 0 | 0 | 0 | 0 | 1 | 0 | 1 | 1 |
| −11 | 1 | 0 | 0 | 0 | 0 | 0 | 0 | 0 | 0 | 1 | 0 | 1 | 1 |
| +Full Count | 0 | 0 | 1 | 0 | 0 | 1 | 1 | 1 | 1 | 0 | 1 | 0 | 1 |
| −Full Count | 1 | 0 | 1 | 0 | 0 | 1 | 1 | 1 | 1 | 0 | 1 | 0 | 1 |

Disregarding the "sign" bit, for a moment, it can be seen that there are four distinct codes to work with, that is 1, 9, 11, and full count. As can be seen from TABLE IV above, bit $2^0$ remains in a logic 1 state and bits $2^8$, $2^9$, and $2^{11}$ are always in a logic 0 state. Bits $2^1$, $2^2$, $2^3$, $2^4$, $2^5$, $2^6$, $2^7$, and $2^{10}$ all have possibilities of a logic 1 or logic 0 state.

The Boolean equations for error detector 84 are:

$$\text{ERROR} = (1) + (9) + (11) + (FC)$$

where $$(1) = (\overline{2}^{11}) * (\overline{2}^{10}) * (\overline{2}^9) * (\overline{2}^8) * (\overline{2}^7) * (\overline{2}^6) * (\overline{2}^5) * (\overline{2}^4) * (\overline{2}^3) * (\overline{2}^2) * (\overline{2}^1) \quad (2)$$

$$(9) = (\overline{2}^{11})*(\overline{2}^{10})*(\overline{2}^9)*(\overline{2}^8)*(\overline{2}^7)*(\overline{2}^6)*(\overline{2}^5)*(\overline{2}^4)*(2^3)$$

-Continued $$ERROR = (1) + (9) + (11) + (FC)$$

$$(11) = (\overline{2^{11}})*(\overline{2^{10}})*(\overline{2^9})*(\overline{2^8})*(\overline{2^7})*(\overline{2^6})*(\overline{2^5})*(\overline{2^4})*(2^3) \\ *(\overline{2^2})*(\overline{2^1})*(2^0) \quad (3)$$

$$*(\overline{2^2})*(\overline{2^1})*(2^0) \quad (4)$$

$$(FC) = (\overline{2^{11}})*(\overline{2^{10}})*(\overline{2^9})*(\overline{2^8})*(2^7)*(2^6)*(2^5)*(2^4)*(2^3) \\ *(2^2)*(\overline{2^1})*(2^0) \quad (5)$$

where * is a logical AND; + is a logical OR, and (1), (9), (11) and (FC) are mutually exclusive.

By grouping terms and combining equations 2–6 into equation (1), ERROR can be shown as:

$$ERROR = \begin{aligned} &(((\overline{2^{11}+2^{10}+2^9+2^8}) * (\overline{2^7+2^6+2^5}) * (\overline{2^4+2^3}) * (\overline{2^2+2^1})) \\ &+ ((\overline{2^{11}+2^{10}+2^9+2^8}) * (\overline{2^7+2^6+2^5}) * (\overline{2^4+2^3}) * (\overline{2^2+2^1+2^0})) \\ &+ ((\overline{2^{11}+2^{10}+2^9+2^8}) * (\overline{2^7+2^6+2^5}) * (\overline{2^4+2^3}) * (\overline{2^2+2^1+2^0})) \\ &+ ((\overline{2^{11}+2^{10}+2^9+2^8}) * (\overline{2^7+2^6+2^5+2^4}) * (\overline{2^3+2^2+2^1+2^0}))\end{aligned}$$

Figure 7:
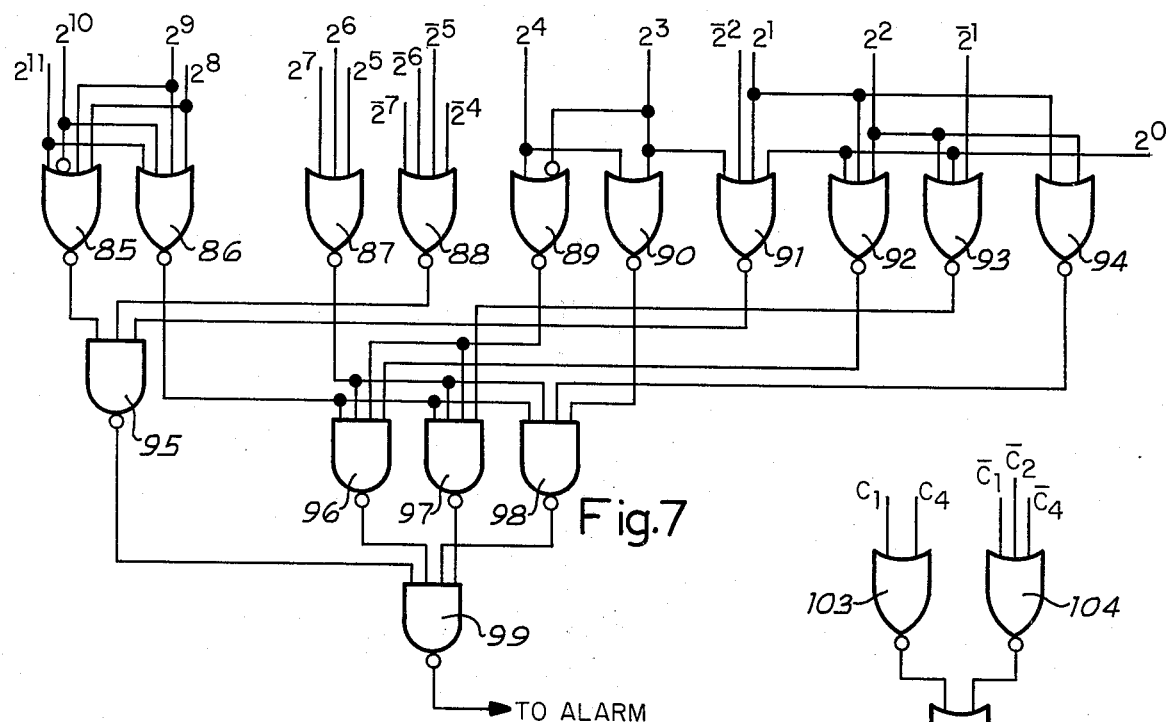
FIG. 7 is a logic diagram for an error detector circuit.

Equation 6 is solved by the error detection circuitry shown in FIG. 7 of the drawings. The output from error detector 84 is fed to a set-reset flip-flop to energize an alarm 101, such as an audible tone warning device.

A second error detector 102 is located with the combinational logic which converts the cyclic gray code to binary. There are three combinations of bits $C_1$, $C_2$, and $C_4$, which never occur and can exist only if the bits become shorted together. This error code is shown in TABLE V.

TABLE V

ERROR CODES FOR BITS $C_1$, $C_2$, and $C_4$

| $C_1$ | $C_2$ | $C_4$ |
|---|---|---|
| 0 | 0 | 0 |
| 1 | 0 | 1 |
| 1 | 1 | 1 |

Figure 8:
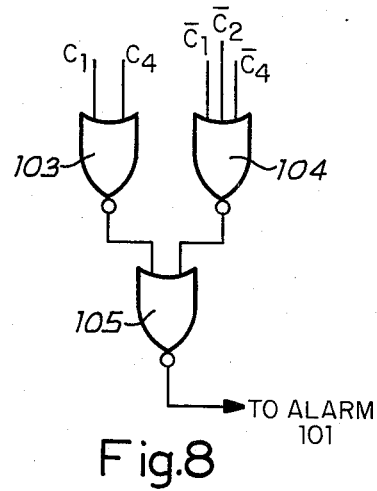
FIG. 8 is a logic diagram for another error detector circuit.

The Boolean equation for detector 102, which is shown in FIGS. 1 and 8 of the drawings, results from the simplest products of sums:

$$E = (C_1 + C_4)(\overline{C_1} + \overline{C_2} + \overline{C_4}), \quad (7)$$

and, as shown in FIG. 8 of the drawings, the error detecting circuit is comprised of three OR gates 103, 104, and 105.

OPERATION

In operation, an encoder 11 is interfaced with the test set of the present invention and encoder 11 is cycled so that the test set will check the output count-sequence of encoder 11. TABLE V above shows three combinations, which if any one is present, indicates a short, and error detector 102 will detect these combinations, and, when one is present, alarm 101 will sound. As encoder 11 is cycled, the test set will allow for changes of ±1, ±9, ±11 and ± full count. As each increment represents 100 feet, the test set is allowing changes of ±100 feet, ±900 feet, ±1100 feet and ± full count. If any other change takes place, a malfunction is occurring in the encoder, and error detector 84 will detect this change and sound alarm 101.

It can thus be seen that the present invention provides a dynamic test set for checking shaft-angle-to-digital encoders whose output code consists of two distinctly different gray codes. The test set of the present invention compares a present output state of an encoder with the previous output state of the encoder to determine if the output data of the encoder appears in the proper sequence.

Obviously many modifications and variations of the present invention are possible in the light of the above teachings. It is therefore to be understood that within the scope of the appended claims, the invention may be practiced otherwise than as specifically described.

I claim:

1. A device for checking a disc-type digital encoder which provides gray code outputs and cyclic gray code outputs corresponding to positions of a shaft of said encoder comprising, a first converter for converting a gray code to a first binary code, a second converter for converting a cyclic gray code to a second binary code, means for multiplying said first binary code by a factor of ten, adder means for adding said first binary code multiplied by a factor of ten and said second binary code, means connected to the output of said adder means for comparing an output against a previous output including an error detector connected to the output of said adder means for checking for a change in binary count of ±1, ±9, ±11, and ± full count, and an alarm circuit connected to said error detector for providing a signal when said error detector detects a change other than ±1, ±9, ±11 and ± full count, whereby any change other than ±1, ±9, ±11 or ± full count indicates an output error in a disc type digital encoder being checked.

2. A check-out system as set forth in claim 1 having a second error detector having as inputs the cyclic gray code bits from said encoder, said second error detector detecting for logic combinations which can exist only if the bits are shorted together.

3. A check-out system as set forth in claim 2 having said alarm circuit connected to an output of said error detector.

4. A check-out system as set forth in claim 3 wherein said alarm circuit is an audible tone warning device.

* * * * *